United States Patent [19]
Chen

[11] Patent Number: 5,822,980
[45] Date of Patent: Oct. 20, 1998

[54] DEVICE FOR REDUCING MOLECULAR POLLUTANTS IN THE GASES FROM A COMBUSTION ENGINE

[76] Inventor: Jack Chen, 14 Kimberly Cir., Oak Brook, Ill. 60521

[21] Appl. No.: 886,857

[22] Filed: Jul. 1, 1997

[51] Int. Cl.⁶ .................................................. F01N 3/00
[52] U.S. Cl. .................... 60/274; 60/275; 60/280
[58] Field of Search .............. 60/274, 275, 303, 60/311, 315, 280

[56] References Cited

U.S. PATENT DOCUMENTS

| | | | |
|---|---|---|---|
| 3,157,179 | 11/1964 | Boles | 60/275 |
| 3,180,083 | 4/1965 | Heller | 60/275 |
| 3,440,800 | 4/1969 | Messen-Jaschin | 60/275 |
| 3,653,185 | 4/1972 | Scott | 60/275 |
| 4,098,578 | 7/1978 | Stanton | 60/275 |
| 4,376,637 | 3/1983 | Yang | 60/275 |
| 4,689,951 | 9/1987 | Polach | 60/275 |
| 5,199,257 | 4/1993 | Colletta | 60/275 |
| 5,410,871 | 5/1995 | Masters | 60/275 |
| 5,419,123 | 5/1995 | Masters | 60/275 |
| 5,546,747 | 8/1996 | Colletta | 60/275 |

FOREIGN PATENT DOCUMENTS

| | | | |
|---|---|---|---|
| 61-31615 | 2/1986 | Japan | 60/275 |
| 1221-392 | 3/1986 | Russian Federation . | |

*Primary Examiner*—Thomas E. Denion
*Attorney, Agent, or Firm*—Patnaude, Videbeck & Marsh

[57] ABSTRACT

A device for removing molecular pollutants from exhaust gasses has a cylindrical chamber and a rotating probe extending axially through the length of the chamber. A spark pin projects from the outer surface of the probe, and a train of high voltage electric pulses is applied across a cylindrical contact around the inner wall of the chamber and the spark pin. The train of high voltage pulses cause a pattern of sparks to form in the chamber which reduce molecular pollutants to non polluting compounds.

20 Claims, 4 Drawing Sheets

DEVICE FOR REDUCING MOLECULAR POLLUTANTS IN THE GASES FROM A COMBUSTION ENGINE

The present invention relates to the removal of pollutant molecules from the exhaust of a combustion engine, and in particular to decomposing, oxidizing and recombining pollutant molecules to form non-pollutants by subjecting exhaust fumes to electric sparks.

BACKGROUND OF THE INVENTION

Environmental concerns have caused the governments of the leading countries of the world to regulate the exhaust fumes from internal combustion engines to reduce pollutants to the atmosphere. The major molecular pollutants are HC, CO, and $NO_x$. Currently, the most commonly used device for removing pollutants from the internal combustion engine used in motor vehicles is a catalytic converter. Catalytic converters, however, are highly expensive and only work efficiently at high temperatures. They are also bulky in size and are unusable with small engines of the type used in motorcycles and lawn mowers. It would be desirable to provide a device of removing pollutants from exhaust gas which would be less costly and which would operate efficiently at lower temperatures than the catalytic converter, and would be usable with small internal combustion engines.

Purification chambers are currently available which use electrostatic fields to apply a charge to particles moving through the chamber such that the particles can be magnetically withdrawn. Although such devices are suitable for removing pollutants which are condensed into particles having sufficient size to be influenced by magnetic fields, such devices fail to remove pollutants in molecular form.

Masters, U.S. Pat. No. 5,419,123 and Master, U.S. Pat. No. 5,410,871 disclose emission control devices positioned within an elongate chamber having an input and an output. Positioned transverse to the length of the chamber is an electrode in the form of a screen through which the pollutant gases are passed. A second electrode is spaced from the screen of the first electrode, and electric pulses are applied to the two electrodes causing sparks to jump from the second electrode to the screen. The sparks of Masters heat the pollutants within the path of the arc to high temperatures causing them to fracture or reform into non-pollutant molecules. The sparks generated by the device of Masters, however, do not reach all the gases passing through the device.

It would, therefore, be desirable to provide an improved emission control device which would adequately reduce the molecular pollutants in the gas stream, and would not be subject to the limitations found in Masters and would not require high temperatures in a chamber as do existing catalytic converters.

SUMMARY OF THE INVENTION

Briefly, the present invention is embodied in a device for removing molecular pollutants from hot exhaust gasses having an elongate body forming a chamber having an input end and an output end. Within the chamber and around the circumference of the inner surface thereof is a tubular first electrode having a principal longitudinal axis. Extending through the longitudinal axis of the first electrode is an elongated probe having a protrusion along one side thereof, the protrusion of the probe providing a second electrode. The probe with the protrusion attached to the probe is rotated about its longitudinal axis, and a high voltage pulse train is applied across the first and second electrodes. The peak voltages of the pulses are higher than the breakdown voltage of the air between the first and second electrode to cause sparks to jump between the electrodes within the chamber. In accordance with the present invention, the probe is rotated with sufficient speed and the high voltage pules of electricity have a sufficiently high frequency to cause sparks to radiate from the protrusion of the probe to the inner surface of the cylindrical electrode in a pattern which sweeps across a cross section of the exhaust stream with sufficient speed to subject all the gas passing through the chamber to the heat of the highly energized electrons. In this regard, it has been found that an electric spark will heat gasses within a given proximity of a spark to a high enough temperature to cause the pollutants therein to become fractured or recomposed into non-pollutant molecules. Where the frequency of the sparks is sufficiently high, and the probe rotates fast enough, the pattern of sparks formed from a single rotating probe will expose virtually all the gas passing through the chamber to at least one of the sparks emanating therefrom.

Fundamentally, the present invention includes a chamber which received exhaust gasses and a means for generating a matrix of sparks directed across the chamber. Ideally, all of the exhaust gasses passing through the chamber will be subjected to the intense heat generated by at least one of the sparks.

To further improve the efficiency of the above described device, a plurality of first cylindrical probes can be arranged successively along the length of the chamber with the rotating probe extending through the length of all the cylindrical probes such that a plurality of sparks may be generated along the length of the chamber. Gases which fail to become exposed to the sparks generated between the first pair of electrodes will therefore become exposed to sparks of a succeeding pair of electrodes. Molecules of pollutants which are not exposed to a sufficient heat to become broken or reformed as a result of a spark between the first pair of electrodes will thereby be exposed to the sparks of subsequent pairs of electrodes. The gases passing through the output of the chamber will thereby be free of pollutants.

BRIEF DESCRIPTION OF THE DRAWINGS

A better and more complete understanding of the invention will be had by a reading of the following detailed description taken in conjunction with the following drawings wherein.

DETAILED DESCRIPTION OF THE PREFERRED EMBODIMENTS

Figure 1:
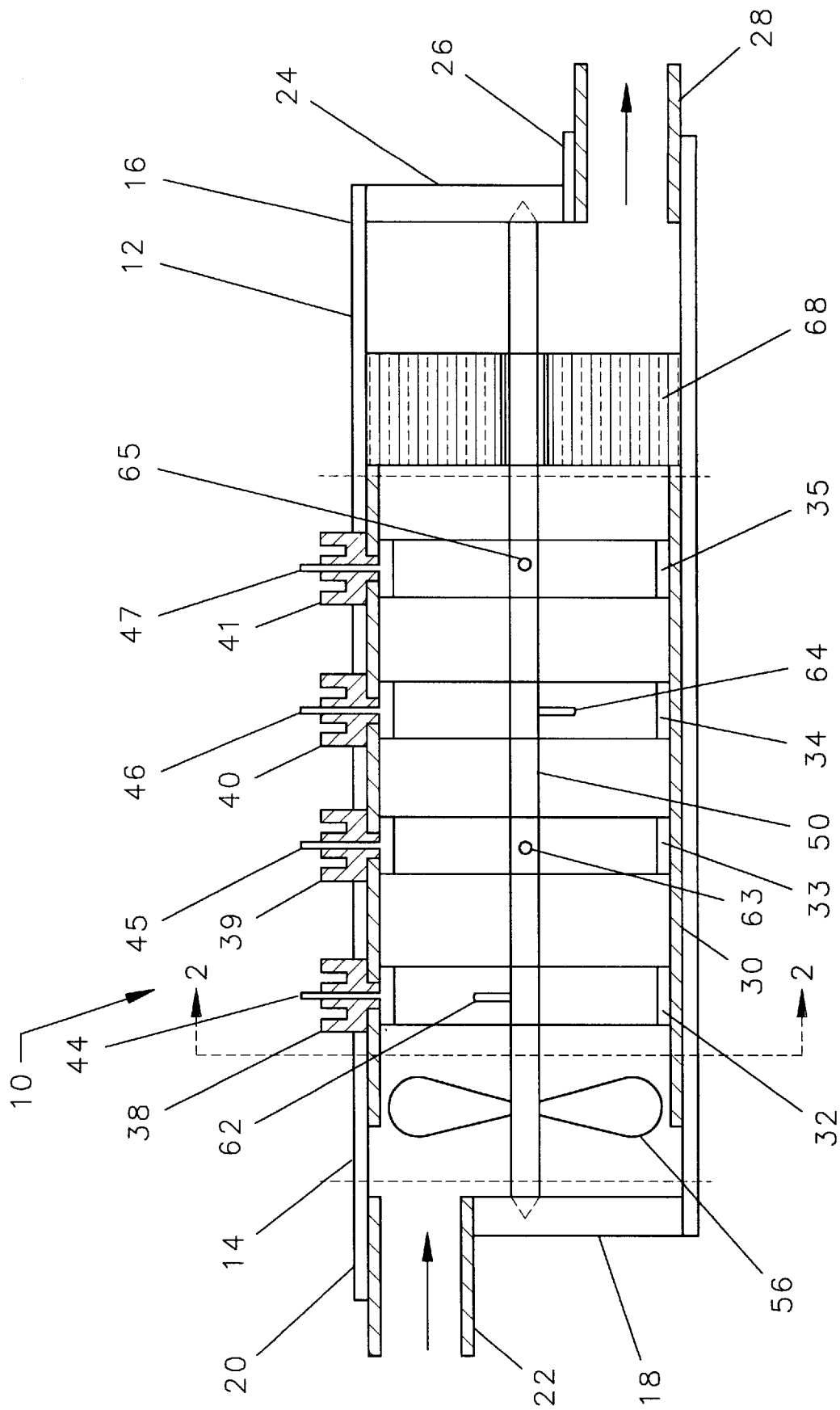
FIG. 1 is a cross-sectional view of a first embodiment of a device in accordance with the present invention.
Figure 2:
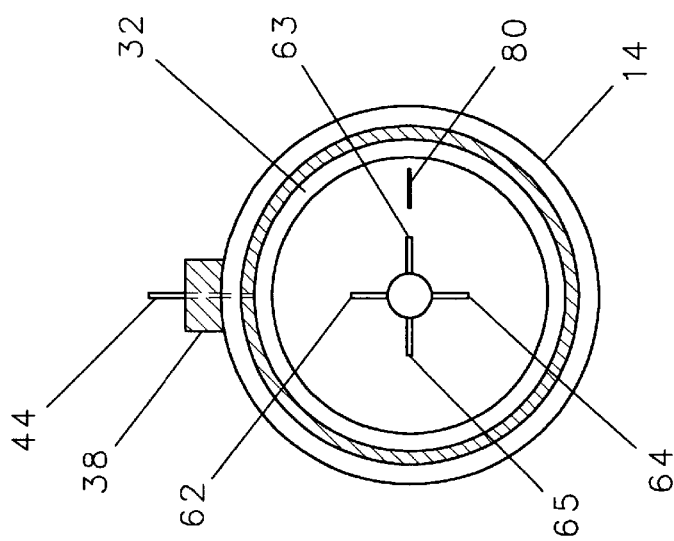
FIG. 2 is a cross-sectional view of the device shown in FIG. 1 taken through line 2—2 thereof.

Referring to FIGS. 1 and 2, a first embodiment device 10 has a generally tubular central body 12 the interior of which is a cylindrical chamber with an input end 14 and an output end 16. Positioned across the input end 14 is an end cap 18 having an off-center input opening 20 into which is fitted a tubular exhaust pipe 22 from an internal combustion engine. Across the output end 16 is a similar end cap 24 having an off-center output opening 26 attached to which is a discharge pipe 28 which may extend outward from the rear end of a vehicle.

Centrally located within the chamber of the body 12 is a tubular electrical insulator 30. Spaced along the inner surface of the insulator 30 are a plurality of tubular first electrodes 32, 33, 34, 35. Each of the first electrodes 32, 33, 34, 35 has an associated insulated plug 38, 39, 40, 41 extending through openings in the tubular chamber 12 and through each of the plugs 38, 39, 40, 41 is a connecting cable 44, 45, 46, 47 for connecting a source of electric power to each of the electrodes 32, 33, 34, 35.

Extending axially through the chamber 12 is an elongate probe 50 having a first end journalled in the first end cap 18, and a second end journalled in the second end cap 24 such that the probe 50 extends through the axis of the spaced-apart cylindrical first electrodes 32, 33, 34, 35. Fitted on the first end of the probe 50 is a fan 56 such that gasses entering the chamber 12 through the exhaust pipe 22 will rotate the turbine and the probe 50 as the gases move toward the discharge pipe 28. The ends of the probe 50 are in physical contact with the end caps 18, 24, and all three parts are made of electrically conductive metal. Consequently, when the device 10 is installed into a motor vehicle with the exhaust pipe from the motor extending into the input opening 20, the probe 50 will be connected to the ground of the vehicle's electrical system.

Extending radially from the outer surface of the probe 50 are spark pins 62, 63, 64, 65, one of which is positioned within each of the tubular first electrodes 32, 33, 34, 35. As shown, the spark pins 62, 63, 64, 65 are positioned at 90 degree intervals around the circumference of the probe 50. Also, near the second end cap 24, but spaced therefrom, is a porous filter 68 having openings therethrough such that the gases moving through the chamber 12 will readily pass through the filter 68.

Preferably, the filter 68 is formed of a material which has known catalytic cracking properties with respect to hydrocarbons such that the filter 68 will enhance the reaction initiated by the sparks. For example, silica-alumina is considered to be a solid acid having such catalytic properties to reduce nitrogen oxides. Cu—Cr and aluminum oxide ($Al_2O_3$) also have such properties.

Figure 3:
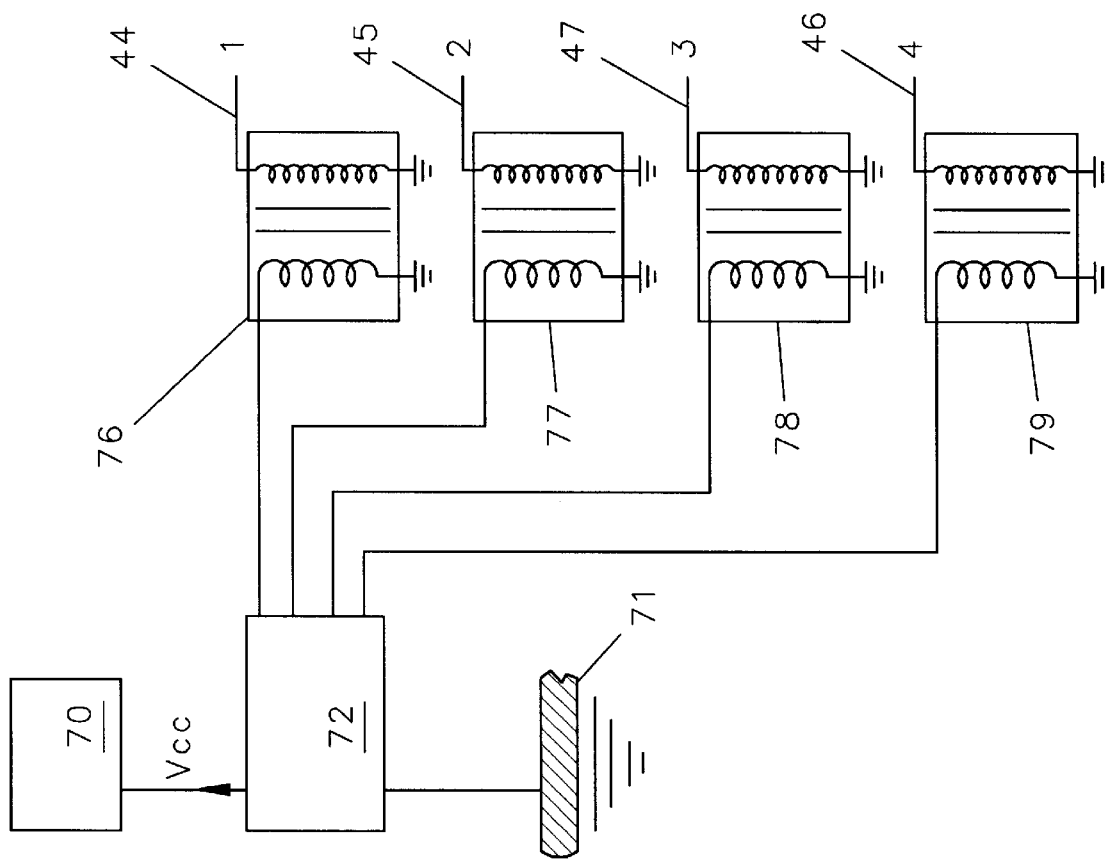
FIG. 3 is a block diagram of a circuit for use with the present invention.

Referring to FIG. 3, electric power applied to the electrodes shown in FIG. 1 is generated from a source such as a battery 70 of a motor vehicle having a frame 71. The DC voltage of the battery 70 is converted to a square wave by a oscillator 72, and the output from the oscillator 72 is directed to a plurality of transformers 76, 77, 78, 79, one transformer for each cylindrical electrodes 32, 33, 34, 35 as depicted in FIGS. 1 and 2. The outputs of the transformers 76, 77, 78, 79 are then connected to the associated cables 44, 45, 46, 47 for directing the output pulses into the chamber 12.

In accordance with the present invention, the output pulses from the transformers 76, 77, 78, 79 are sufficiently high to exceed the breakdown voltage between the distal end of each of the spark pins 62, 63, 64, 65, and the inner surface of the corresponding first electrodes 32, 33, 34, 35 such that a pattern of sparks or matrix will be formed between the probe and the cylindrical electrode. One spark 80 is depicted in the drawings.

The electric spark which ignites combustion in the cylinder of an engine generates intense heat which reduces molecules in the proximity of the spark to non-polluting molecules. The products of ordinary combustion, however, are often not as complete and the partially reduced molecules form the pollutants. A spark crosses a path approximately .02 inches in diameter, and molecules within the path are reduced to non-pollutants. In the preferred embodiment, the sparks form a matrix, or pattern, across a cross-section of the chamber 12 with the sparks having a spacing which is no more than .02 inch. Accordingly, all gas which is within .01 inch of either side of the plane of the matrix is subjected to at least one spark. For example, where the cylindrical electrodes have an outer diameter of approximately two inches, the peak voltage of the output from the transformers should be no less than 10,000 volts. Also, the pulses should have a frequency of at least one kHz and the turbine 56 should rotate the probe 50 at a rate of about 200 r.p.m. to thereby cause about three patterns of sparks to be directed in a dense matrix across the chamber each second.

Figure 4:
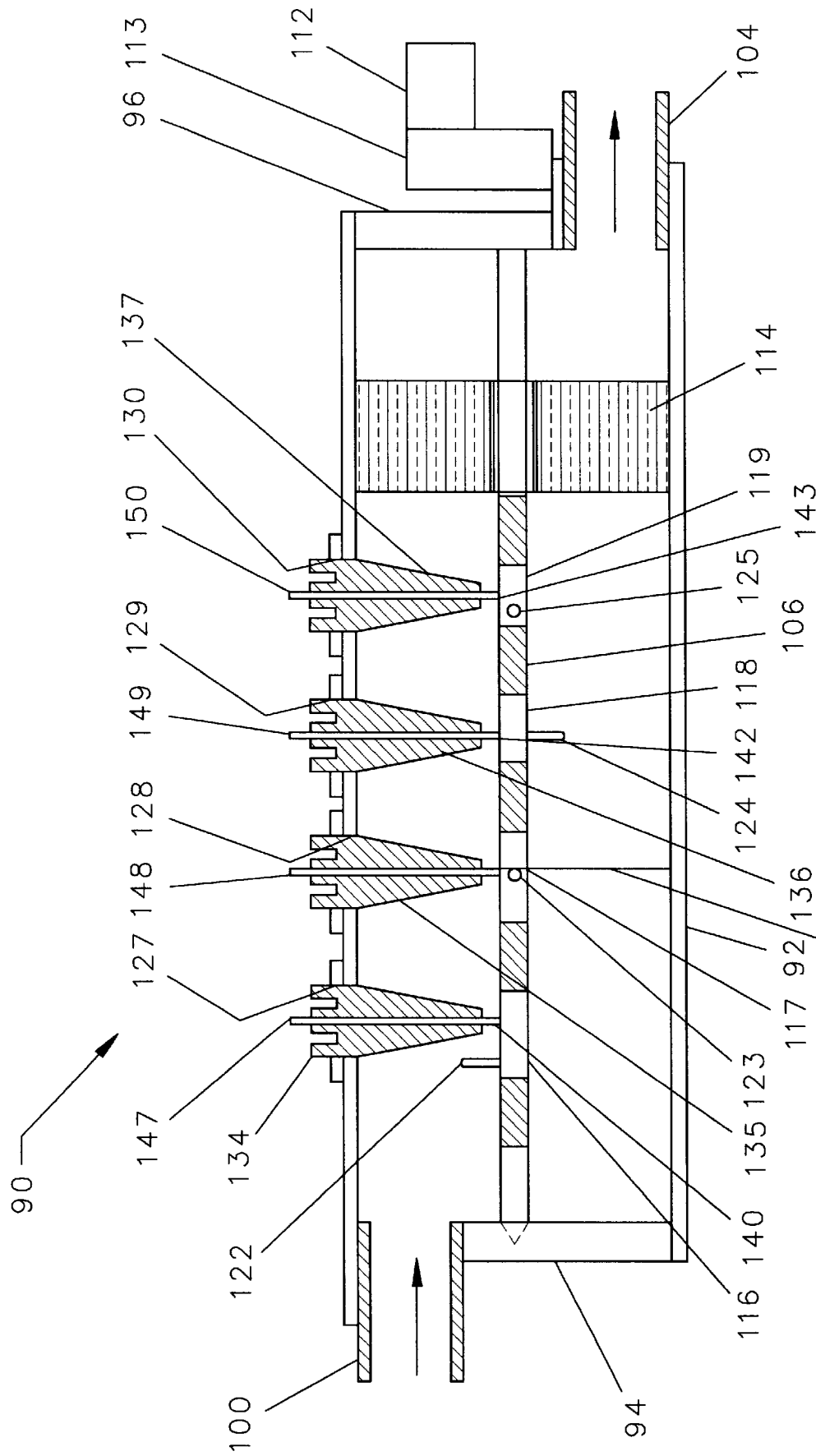
FIG. 4 is a cross-sectional view of a second embodiment of a device in accordance with the present invention.

Referring to FIG. 4, in a second embodiment of the invention, a device 90 has a tubular metal body 92 forming a chamber therein. Fitted across the input end is a first end cap 94 and fitted across the output end is a second end cap 96. An off-center input opening in the first end cap 94 is adapted to receive the distal end of an exhaust pipe 100, and an off-center opening in the second end cap 96 is adapted to receive a discharge pipe 104.

Extending longitudinally through the axis of the generally cylindrical chamber is an elongate, generally non-conductive probe 106 having a first end journalled in the first end cap 94 and a second end journalled in the second end cap 96. In this embodiment, the probe 106 is rotated by a motor 112 connected to a gearing 113 for rotating the probe at a given speed. Near the second end cap 110 is a porous filter 114 similar to the filter 68 of the first embodiment.

Positioned along the length of the probe 106 are spaced conductive bands 116, 117, 118, 119, which are preferably made of copper and may be coated with gold. Extending from each of the bands 116, 117, 118, 119 are spark pins 122, 123, 124, 125, respectively. Each of the bands has an unobstructed portion adjacent the associated pin 122, 123, 124, 125 thereof.

As can be seen, the chamber 92 has a plurality of spaced apertures 127, 128, 129, 130, along the length thereof, one aperture 127, 128, 129, 130 positioned radially outward of the unobstructed portion of each of the bands 116, 117, 118, 119. Extending through each of the apertures 127, 128, 129, 130 is an inwardly extending radial arm 134, 135, 136, 137. At the distal end of each arm 134, 135, 136, 137 is a brush 140, 141, 142, 143, respectively, which is adapted to make electrical contact with the associated conductive band 116, 117, 118, 119, respectively Extending longitudinally through each of the radial arms 134, 135, 136, 137 is a conductive cable 147, 148, 149, 150 such that each of the conductive bands and the associated pin 122, 123, 124, 125, respectively, is connected through the associated brush and cable 147, 148, 149, 150 to one of the transformers 76, 77, 78, 79 depicted in FIG. 3.

In the second embodiment, the positive leads from the transformers 76, 77, 78, 79 as shown in FIG. 3, are connected to the cables 147, 148, 149, 150, and the negative leads of the transformers are connected to ground such that the chamber 12 itself becomes the cathode, and the distal ends of each of the spark pins 127, 128, 129, 130 are the anodes. This is the reverse of the first embodiment in which the spark pins 62, 63, 64, 65 are the cathodes and the tubular electrodes 32, 33, 34, 35 are the anodes.

As can be seen, the device of the present invention will cause a pattern of sparks to jump between the spark pins 62, 63, 64, 65, of the first embodiment, or 122, 123, 124, 125 in the second embodiment, to the cylindrical electrodes 32, 33, 34, 35 of the first embodiment or the housing 92 of the second embodiment. The heat generated from the sparks will cause the molecules of pollutants suspended in the gas to be broken or reconstituted into other molecules which are non-pollutants.

Figure 5:
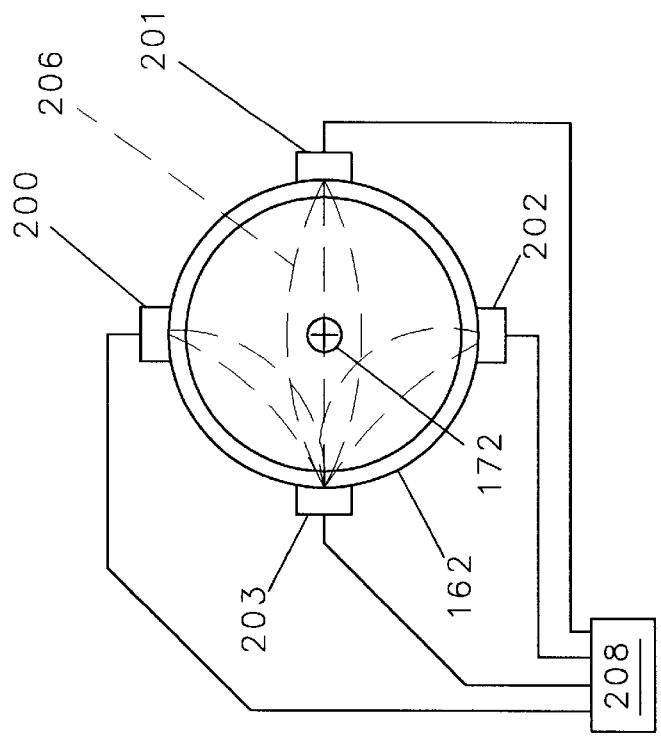
FIG. 5 is a cross-sectional view of a third embodiment of the invention.

Referring to FIG. 5, in a third embodiment, a device 160 has an elongate cylindrical electrically conductive chamber body 162 with an input and an output like the prior embodiments. Extending through the axis of the chamber 162 is an elongate electrically conductive probe 172 which is insulated from the chamber body 162 such that the probe 172 and the chamber body 162 form the contacts across which high voltage pulses of electricity are applied. Like the first two embodiments, the third embodiment may be configured to have a plurality of pairs of contacts 162, 172 extending along the length of the chamber, however, only one pair of contacts is depicted herein.

Positioned around the circumference of the chamber 160 are a plurality of coils forming electro magnets 200, 201, 202, 203. In this embodiment, the electrically conductive probe 172 is the anode, and the electrically conductive chamber body 162 is the cathode as was the case with the second embodiment The magnets 200, 201, 202, 203 form a magnetic field depicted by force line 206.

The magnetic fields formed by the four coils 200, 201, 202, 203 is controlled by a control circuit, 208 which may include a microprocessor. By controlling the magnetic field 206, the direction of the sparks emitted by the probe 172 can be controlled. Specifically, the magnetic field can be rotated around the probe 172 to thereby generate a rotating pattern of sparks between the probe 172 and the chamber body 162 which extends around the entire circumference of the chamber 162.

The invention requires that a pattern of sparks be generated with each of the sparks reaching through the interior of the chamber to the outer walls thereof such that the pattern of sparks define a two dimensional matrix through which all the exhaust gases must flow. In the preceding three embodiments, the matrix is formed by directing sparks radially toward or away from a central probe.

Figure 6:
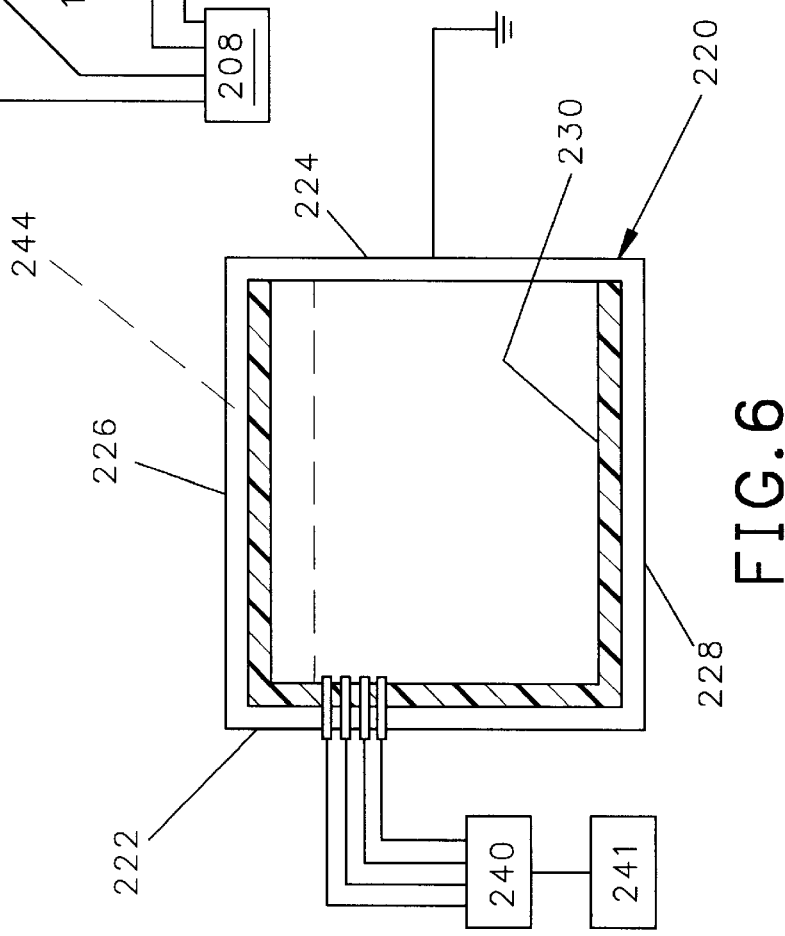
FIG. 6 is a cross-sectional view of a fourth embodiment of the invention.

Referring to FIG. 6, the matrix of sparks is formed in a rectangular pattern rather than an angular pattern. In this embodiment, the chamber 220 has parallel opposing inner side walls 222, 224 and upper and lower walls 226, 228, respectively. The upper and lower walls 226, 228 and side wall 226 are all covered by an insulator 230. Extending through the insulated side wall 222 are a plurality of contacts 235, four of which are depicted. Each of the contacts 235 is sequentially connected through a switching circuit 240 to a source of electric pulses 241 similar to that described with respect to FIG. 3 above. The metal conductive chamber 220 is grounded at 242 such that the sparks 244 jump between the contacts 235 and the opposing wall 224 in a rectangular matrix.

The molecular pollutants common in the exhaust gases of a combustion engine are hydrocarbons, carbon monoxide, nitrogen oxide and nitric oxides. Carbon monoxide will be oxidized to carbon dioxide and the nitrogen oxides and hydrocarbons will be reformed into non-polluting compounds as a a result of being subjected to the sparks. It is believed that the metallic walls of the electrodes and the housing are oxidized by the electric arc of the sparks and provide some catalytic properties to break down the pollutant molecules, although the reactions are not fully understood.

While several embodiments of the present invention have been disclosed, it will be apparent to those skilled in the art that many changes and modifications may be made without departing from the true spirit and scope of the invention. It is the purpose of the appended claims to cover all such changes and modifications which fall within the true spirit and scope of the invention.

What is claimed:

1. A device for reducing molecular pollutants from a stream of exhaust gas comprising, an elongate tubular central body forming a chamber with a principal longitudinal axis, said tubular body having an inner surface, an input, an output and being electrically conductive, an elongate probe extending axially through said tubular central body and being rotatable within said tubular body about a principal longitudinal axis of said probe, a spark pin extending from a surface of said probe, said spark pin having a distal end spaced from said inner surface of said tubular central body, means for electrically insulating said spark pin from said tubular central body, means for generating an electric spark between said spark pin and said tubular body, means for rotating said probe within said tubular body, and means for connecting said input end to the exhaust of an internal combustion engine.

2. The device of claim 1 wherein said means for generating a spark generates a train of electric pulses across electrodes for forming a train of sparks.

3. The device of claim 1 and further comprising, a second spark pin on said surface of said probe, said spark pin insulated from said second spark pin.

4. The device of claim 1 and further comprising a turbine on said probe, said turbine driven by gases passing through said tubular body to rotate said probe.

5. The device of claim 1 and further comprising a motor for rotating said probe.

6. The device of claim 1 and further comprising a filter in said tubular body said filter having catalytic cracking properties with respect to hydrocarbons.

7. The device of claim 6 wherein said filter is made of at least one of silica-alumina, Cu—Cr and aluminum oxide.

8. A device for reducing molecular pollutants from a stream of exhaust gas comprising, an elongate chamber having a cavity with an inlet and an outlet, a tubular electrode having a principal longitudinal axis, said tubular electrode positioned within said cavity, an elongate probe extending axially through said tubular electrode, said elongate probe being rotatable within said tubular electrode about a principal longitudinal axis, a spark pin extending from a surface of said probe, said spark pin having a distal end spaced from an inner surface of said tubular electrode, means for electrically insulating said spark pin from said tubular electrode, means for generating a spark between said distal end of said spark pin and said tubular electrode, means for rotating said probe within said tubular electrode, and means for connecting said input end of said chamber to an exhaust of an internal combustion engine.

9. The device of claim 8 wherein said means for generating a spark generates a train of electric impulses across said electrodes for forming a train of sparks.

10. The device of claim 8 and further comprising, a second spark pin on said surface of said probe.

11. The device of claim 8 and further comprising a motor for rotating said probe.

12. The device of claim 8 and further comprising a turbine on said probe, said turbine driven by gases passing through said tubular chamber to rotate said probe.

13. The device of claim 8 and further comprising a filter in said tubular chamber, said filter having catalytic cracking properties with respect to hydrocarbons.

14. The device of claim 13 wherein said filter is made of at least one of silica-alumina, Cu—Cr, and aluminum oxide.

15. A device for reducing the molecular pollutants from exhaust gas comprising, a chamber having an input, and output, and an outer wall extending around said chamber, said outer wall enclosing a path of travel for exhaust gases entering said input and existing said output, pulse means for generating a plurality of electric pulses, matrix means connected to said pulse means, said matrix means for forming a two-dimensional pattern of sparks transverse to a flow of gases through said chamber.

16. The device of claim 15 wherein said matrix means forms a pattern of sparks which are no more than .02 inch from an adjacent spark.

17. The device of claim 15 wherein said pulse means generates a train of high voltage pulses.

18. The method of removing molecular pollutants from a stream of exhaust gas comprising the steps of, directing said exhaust gas through a chamber having an input and an output, and a wall, positioning a plurality of electrical contacts within said wall, providing means for forming a matrix of sparks across said electrical contacts, generating a train of successive electric pulses, each of said electric pulses having a voltage sufficient to cause a spark across said electrical contacts in said chamber, and directing said train of electric pulses to said means for forming a matrix of sparks.

19. The method of claim 18 and further comprising the step of, passing said stream of exhaust gas through a filter having catalytic cracking properties with respect to hydrocarbons.

20. The device of claim 15 and further comprising a filter in said chamber, said filter having catalytic cracking properties with respect to hydrocarbon.

* * * * *